US005230368A

United States Patent [19]

Berfield

[11] Patent Number: 5,230,368

[45] Date of Patent: Jul. 27, 1993

[54] CHEMICAL INTAKE SYSTEM

[75] Inventor: Robert C. Berfield, Jersey Shore, Pa.

[73] Assignee: Shop Vac Corporation, Williamsport, Pa.

[21] Appl. No.: 931,689

[22] Filed: Aug. 18, 1992

[51] Int. Cl.[5] ............ F16K 19/00

[52] U.S. Cl. ............ 137/889; 137/893; 239/311

[58] Field of Search ............ 239/304, 307, 311; 137/889, 893

[56] References Cited

U.S. PATENT DOCUMENTS 2,376,565 5/1945 Williams ............ 137/893
3,112,884 12/1963 Gilmour ............ 137/893 X
3,207,444 9/1965 Kelley et al. .
4,033,509 7/1977 Sheets ............ 239/311 X
4,322,036 3/1982 Bly ............ 239/311
4,366,081 12/1982 Hull .
4,383,935 5/1983 Hull .
4,474,680 10/1984 Kroll .
4,829,624 5/1989 Lackner et al. .
4,830,790 5/1989 Stevenson .
5,040,950 8/1991 Dalquist, III et al. .

*Primary Examiner*—Robert G. Nilson
*Attorney, Agent, or Firm*—Marshall, O'Toole, Gerstein, Murray & Borun

[57] ABSTRACT

A chemical intake system has an aperture plate with apertures of varying fluid flow resistance all connected to a first fluid source. A first tube is connected to one of the apertures in the aperture plate and to a suction tube. A second tube is connected to a second fluid source and to the suction tube. The amount of the first fluid flowing into the suction tube is regulated by attaching the first tube to various apertures in the plate. The amount of fluid flowing through the first tube also regulates the amount of the second fluid flowing through the second tube and into the suction tube.

7 Claims, 3 Drawing Sheets

CHEMICAL INTAKE SYSTEM

BACKGROUND OF THE INVENTION

The present invention relates generally to the control of fluid flow from a container, and more particularly to a chemical intake system which controls the delivery of a first fluid by controlling the flow of a second fluid.

BACKGROUND ART

In pressure spray washers and the like it is necessary to introduce one or more fluids into the flow of another fluid. For instance, a liquid soap or other cleaning fluid is often mixed with air and then introduced into a water flow to create a foaming mixture. Often, it is necessary to change the relative proportions of soap and water or to stop the flow of soap altogether when it is desired to rinse an object with water alone. Thus, some means must often be provided to permit adjustment of the soap flow.

Kelley, et al., U.S. Pat. No. 3,207,444, discloses a water spray attachment capable of mixing both air and a liquid additive, such as soap, into a stream of water. The device in Kelley, et al. has a siphon tube disposed in a detergent container and the siphon tube is connected to a mixing chamber where a venturi is created by the flow of water through the chamber. An opening in another portion of the mixing chamber is connected to an air chamber having a number of holes. The holes may be covered by a user,s thumb to regulate the amount of air entering the mixing chamber and thereby also affect the amount of soap entering the mixing chamber.

Dalquist, III, et al., U.S. Pat. No. 5,040,950, discloses a high-pressure washing system capable of mixing air and cleaning fluid into a water stream. A tube inserted into a cleaning fluid container is connected to a suction tube which terminates adjacent a venturi in the water flow. Also connected to the suction tube is an air inlet tube wherein the amount of air flowing through the tube is controlled by a valve that has a rotatable dial. The dial is rotated to align a series of holes with a lumen in the air tube to regulate both the air and cleaning fluid flow.

Each of the above systems is not entirely satisfactory. While Kelley, et al. may be relatively inexpensive to manufacture, it requires a user to maintain a thumb in certain positions while using the spray washer. Maintaining the thumb in the required positions may prove difficult or tiresome for some individuals or during certain uses. The device in Dalquist, et al. may be easy to use, but its valve has moving parts which may break or wear out and will also add cost to the spray washer. Thus, there remains a need for a chemical intake system which allows selective metering of fluid flow that is easy to use, reliable and inexpensive to manufacture.

SUMMARY OF THE INVENTION

In accordance With the present invention, a chemical intake system designed for mixing a first fluid and a second fluid has a first tube with a lumen and a second tube with a lumen, where the second tube lumen is adapted to communicate with a source of the second fluid. A third tube having a lumen is adapted for connection to a suction source, and the first tube lumen and second tube lumen are connected to the third tube lumen. An aperture plate has at least two apertures where each aperture is adapted to communicate with a source of the first fluid. Each aperture has an effective fluid flow resistance associated therewith, and each aperture has a different fluid flow resistance. A fitting disposed adjacent each aperture is designed to permit releasable attachment of the first tube to the fitting, so that the first tube lumen may be placed in fluid communication with the first fluid source.

More specifically, the second fluid source may have a second fluid container and a second fluid container cap, where the aperture plate is formed integrally with the cap. The aperture plate may have four apertures and each aperture has a minimum diameter different from the minimum diameter of the other apertures. A storage fitting may be provided which, when the first tube is attached thereto, prevents the flow of fluid through the first tube. The storage fitting will also prevent fluid flow through the third tube when that tube is attached to it. The storage fitting may be placed on the second fluid container.

DESCRIPTION OF THE PREFERRED EMBODIMENT

Figure 1:
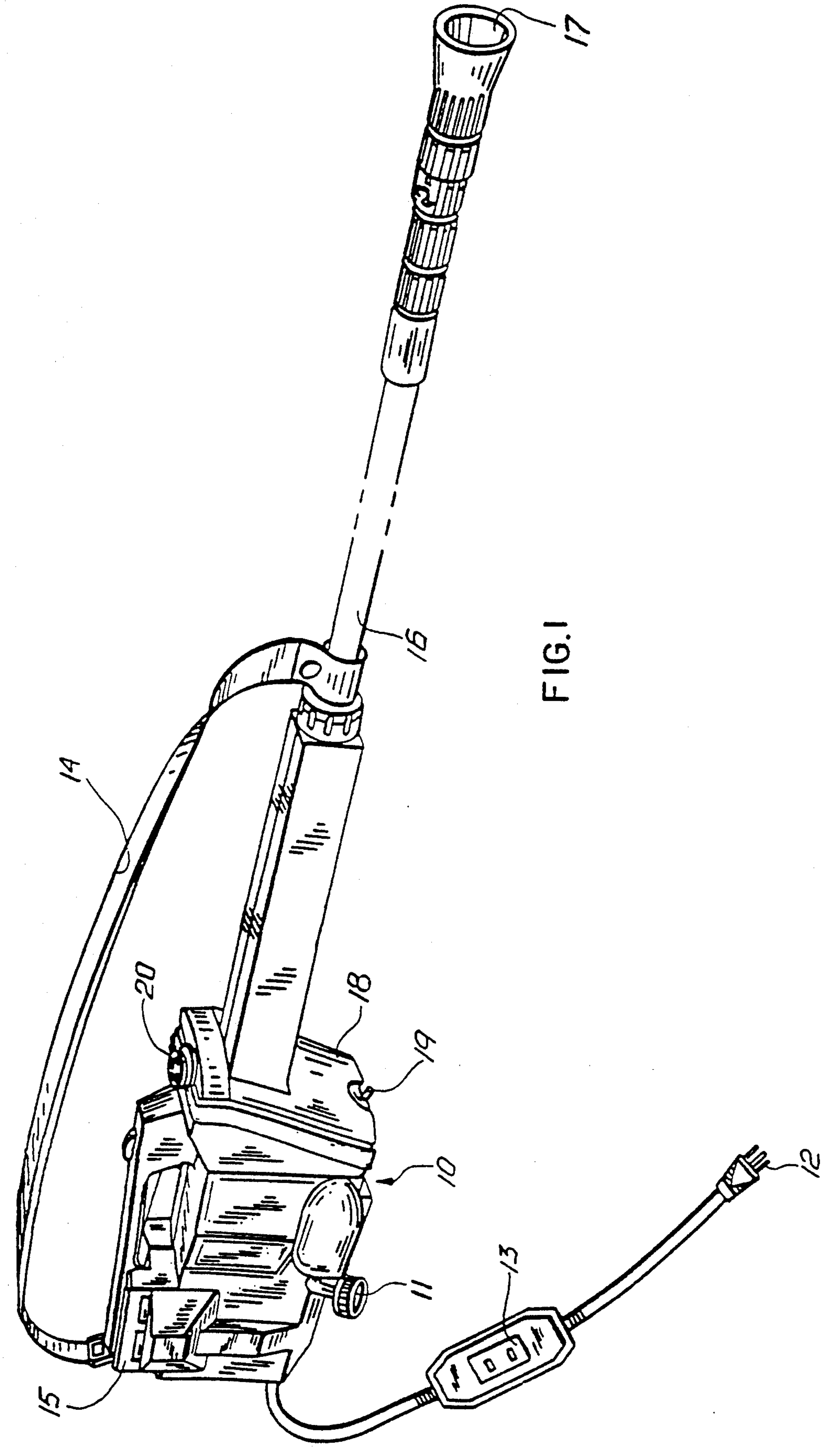
FIG. 1 is a perspective view of a spray washer incorporating the chemical intake system of the present invention.

Referring now to FIG. 1, a spray washer indicated generally at 10 has a hose connection fitting 11 for attaching the washer to a water source. The spray washer 10 may be equipped with an electric motor (not depicted) which is connected to an electric plug 12 and a ground fault interrupter 13. A shoulder strap 14 attaches at one end to a housing 15 and at the other end to a barrel 16 which terminates in a nozzle 17.

A cleaning solution container 18 is designed to be placed over the nozzle 17 and attached to the housing 15. At the bottom of the container 18 is a cleaning solution fitting 19. As described more fully below, the cleaning solution fitting 19 is attached to a tube or conduit during use to direct cleaning solution into the spray washer. At the top of the container 18 is a container cap 20.

Figure 2:
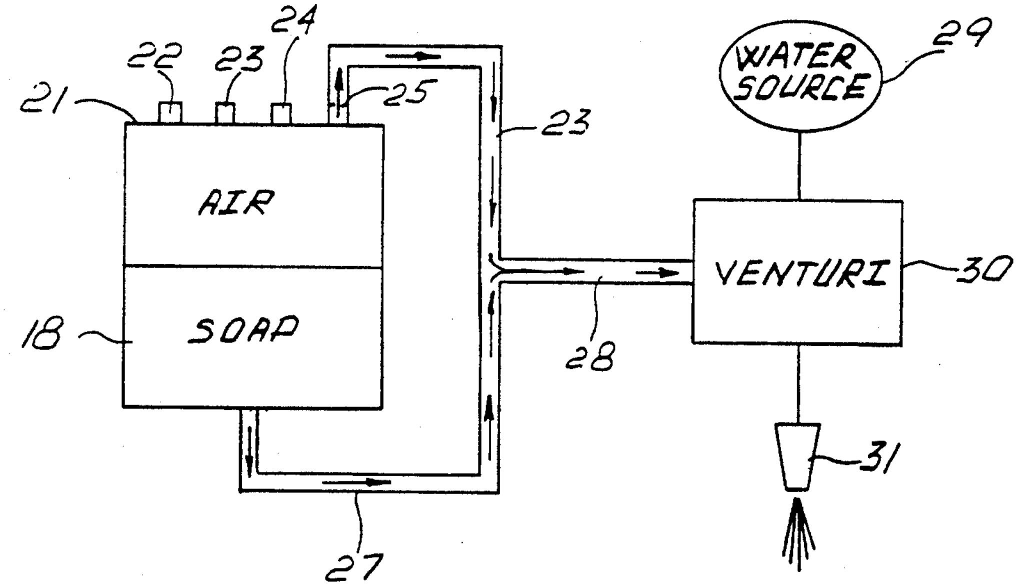
FIG. 2 is a schematic diagram illustrating fluid flow within the spray washer of FIG. 1.
Figure 3:
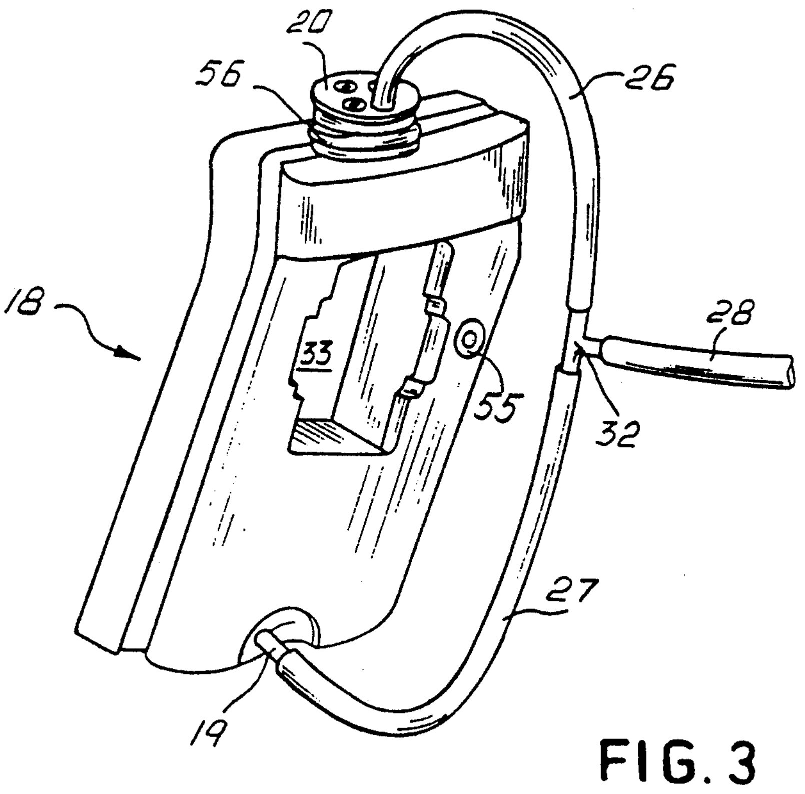
FIG. 3 is a perspective of the cleaning solution tank shown in FIG. 1.

FIG. 2 diagrammatically depicts fluid flow within the spray washer 10 while FIG. 3 shows the container 18 in greater detail. With reference first to FIG. 2, soap or cleaning solution is stored in the cleaning solution container 18 and exits the container through cleaning solution tube 27. An aperture plate 21 has four apertures 22, 23, 24 and 25 in communication with an air source (described hereinafter) wherein each aperture is of a different cross-sectional size and thus has a different fluid flow resistance associated therewith. Each aperture, therefore, permits different amounts of air flow when the aperture is connected to a suction source. Fluid flow resistances may be varied by varying the diameters of the various apertures. An air tube 26 may be connected to any one of four fittings 35-38 associated with and surrounding the apertures 22-25. Preferably, although not necessarily, the aperture plate 21 is formed integrally with the cap 20, as noted in greater detail hereinafter.

A cleaning solution tube 27 is connected to the air tube 26 and a suction tube 28. A low pressure is created in the suction tube 28 by a venturi 30, when water from a water source 29 connected to the hose fitting 11 passes through the venturi 30 and out the nozzle 31. This low pressure draws soap and air through the lumens of the tubes 27, 26, respectively, into the water stream passing through the venturi 30 and out the nozzle 31.

As seen in FIG. 3, the cleaning solution container 18 includes a cleaning solution fitting 19 near the bottom thereof. The fitting 19 has a passageway in its interior which permits flow of cleaning solution through the fitting and into the cleaning solution tube 27. At the top of the container 18 is a neck 56, which is designed to mate with the container cap 20. The cap 20 includes the four apertures 22-25 and fittings 35-38 in a top planer portion thereof, and thus serves as the aperture plate 21 for connection of the air tube 26 to air within the container 18 above the cleaning solution. The air tube 26 and the cleaning solution tube 27 are connected by a tube junction 32, which then connects with the suction tube 28.

The container 18 is shaped and contoured to fit and be retained against spray washer 10. The container has a nozzle opening 33 so that the container can fit over the nozzle 17 and the barrel 16 and onto the housing 15 of the spray washer. The overall shape and size of the container may be modified to suit a variety of applications while still falling within the scope of the present invention.

The container 18 has a storage fitting 55 onto which any of the tubes may be attached. The fitting does not have an aperture or passageway therethrough and is not designed to permit the flow of fluid. Instead, the fitting 55 is used only when it is desirable that no fluid flow through a certain tube. For instance, when no air is to enter the system, the air tube 26 may be attached to the storage fitting 55 instead of one of the fittings in the cap 20. The storage fitting 55 may also be used when the container has been removed from the spray washer 10 and the suction tube 28 has been removed from its suction source. In such a case, attaching the suction tube 28 to the storage fitting 55 will prevent cleaning solution within the container 18 from flowing out through the cleaning solution fitting 19, the cleaning solution tube 27, the tube junction 32 and the suction tube 28.

Figure 4:
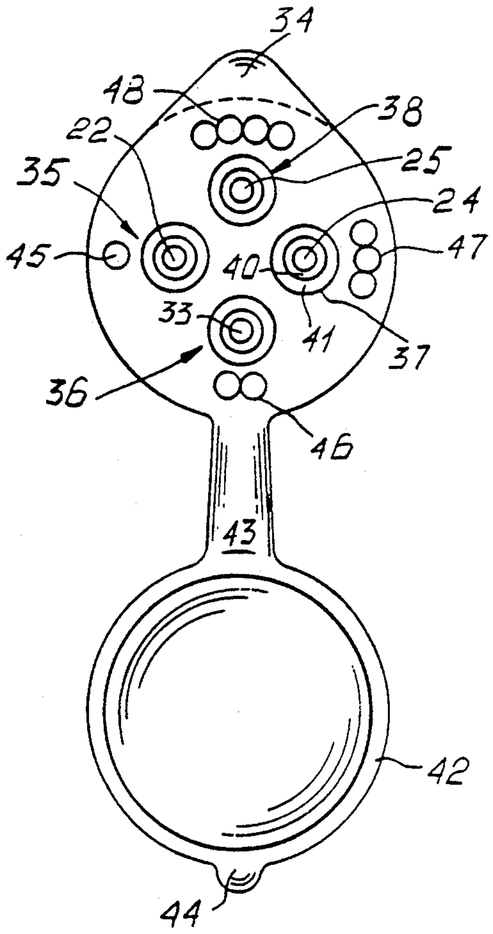
FIG. 4 is a top view of the container cap and retaining ring shown in FIGS. 1 and 3.
Figure 5:
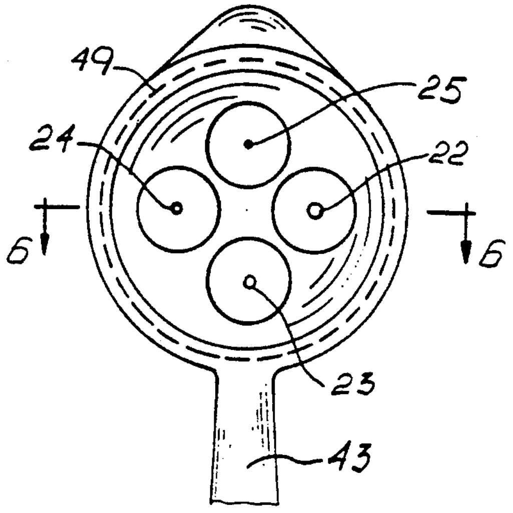
FIG. 5 is a bottom view of a portion of the container cap of FIG. 4.
Figure 6:
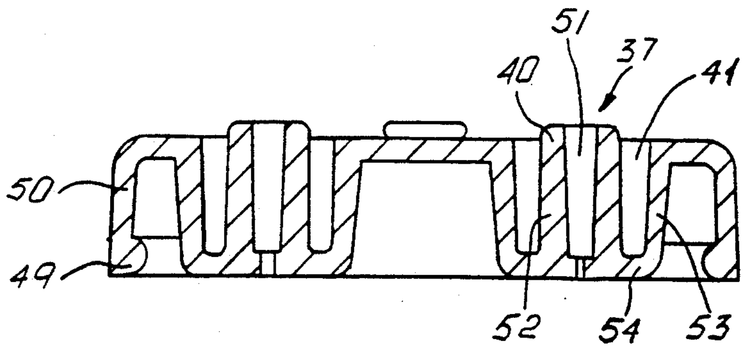
FIG. 6 is a cross-sectional view taken along the lines 6—6 of FIG. 4.

FIGS. 4-6 depict features of the container cap 20 in greater detail. Each fitting 35-38 is designed such that the air tube 26 can be releasably attached thereto in a reasonably airtight manner while still permitting easy insertion onto and withdrawal from the fitting. The fittings 35-38 are identical and hence only the fitting 37 will be described in detail herein. The fitting 37 has a recess 41, which is defined by a recess sidewall 53, a recess endwall 54 and circular passageway wall 52. The circular passageway wall 52 is hollow so as to define a passageway 51 therethrough. The passageway 51 is disposed in fluid communication with the aperture 22 and is tapered so that the diameter is greater at the top of the cap than at the bottom of the cap. The top of the passageway wall 52 forms a rim 40 around the aperture 22. Rim 40 is rounded to aid in the insertion of the passageway wall into the lumen of the tube 26. When a tube is inserted onto one of the fittings, the tube wall is inserted into the recess 41 until the end of the tube abuts against the recess endwall 54 and is thereby prevented from further insertion.

The cap 20 is designed to be placed over the neck 56 of the container 18. A lift tab 34 aids in removal of the cap 20 from the neck of the container 18. As seen in FIG. 6, an outer wall of the cap comprises a flange 50 and a lip 49. The lip 49 fits around the neck 56 of the container so that the cap 20 fits snugly thereon.

The cap 20 may also have a retaining ring 42 connected to the cap by a hinge 43. The retaining ring 42 fits over the neck 56 of the container 18 in order to prevent the cap 20 from being misplaced when the container is opened for filling. A ringtab 44 is provided so that the ring may more easily be inserted over or removed from the neck 56 of the container 18.

The top of the cap 20 has four resistance indicia or demarcations 45, 46, 47 and 48 associated with each of the fittings 35-38. Each demarcation has a different number of raised circles to indicate the relative fluid flow resistance of each aperture.

The dimensions of the cap 20 will of course be dependent upon the container 18 with which it is designed to be used. The top of each passageway may have a 0.090 inch diameter. In order to provide different fluid flow resistances, the minimum diameter for each aperture may be 0.025, 0.040, 0.055 and 0.075 inch. The diameter of the rim 40 of each fitting and the width of each recess 41 is dependent upon the dimensions of the tube with which a fitting is designed to connect. Suitable dimensions are 0.210 inch in diameter for the rim 40 and 0.360 inch outer diameter for the recess 41, when a tube having an outer diameter of 0.312 inch and an inner diameter of 0.188 inch is used. The passageway wall 52 may be slightly thicker at the bottom of the cap than at the top so that a tube can be inserted easily over the rim while still providing an excellent seal.

The cap may be manufactured from any semi-rigid material such as Copolymer Polypropylene Eastman P6M4A-006 manufactured by the Eastman Chemical Division of Eastman Kodak Corporation. The cleaning solution container 18 may be made of any stiff material such as Copolymer Polypropylene, Eastman Tenite P6M4A-006 manufactured by the Eastman Chemical Division of Eastman Kodak Corporation. The tubing must be relatively flexible so that it can be moved from fitting to fitting and so that the tube will form a good seal around the passageway wall of the fittings. A suitable material for the tubing is GO 1480 vinyl tubing-clear, Excelon Gas and Oil #3.

During operation of the spray washer, suction is created by venturi 30 in suction tube 28, thus creating suction through tube junction 32 and into air tube 26 and cleaning solution tube 27. The relative amounts of air drawn from the source of air comprising the space above the cleaning solution in the container 18 and cleaning solution entering suction tube 28 are regulated by placing the air tube 26 onto one of the fittings 35-38. If it should be desired to prevent all air from entering the system, the air tube 26 is placed on the storage fitting 55. In that event, a maximum amount of cleaning solution enters the system. More air and correspondingly less cleaning fluid enters the system when air tube 26 is placed on a fitting with a larger diameter aperture. A sufficient amount of air will be able to pass through any aperture by properly venting the container. In this instance, venting may be provided by the apertures which are not connected to the air tube 26. Conversely, in order to have a maximum amount of air and a minimum amount of cleaning solution enter the spray washer, the air tube 26 can be disconnected from all fittings 35–38 so that air may freely enter the air tube.

The chemical intake system described herein is directed to use with a spray washer where the flows of two fluids, i.e., cleaning solution and air, are regulated. However, the present invention is equally applicable to other chemical intake systems in which a first fluid and a second fluid are mixed and transported. In the preferred embodiment, the cap 20 of the container 18 serves as the aperture plate 21. Alternatively, the aperture plate could be placed on any part of the spray washer 10 or be separate therefrom and still satisfactorily perform the function of regulating the air flow through the air tube 26. Forming the aperture plate 21 integrally with the cap 20 has proven to be economical and places the fittings 35–38 at a location which is easily accessible to the user of the spray washer 10.

Numerous modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A chemical intake system capable of mixing a first fluid and a second fluid comprising:

a first tube having a lumen;

a second tube having a lumen wherein said second tube lumen, is adapted to communicate with a source of said second fluid;

a third tube having a lumen adapted for connection to a source of suction wherein said first tube lumen and said second tube lumen are connected to said third tube lumen; and an aperture plate having at least two apertures therein, each aperture adapted to communicate with a source of the first fluid wherein each aperture has an effective fluid flow resistance associated therewith and the fluid flow resistances of the apertures are different and wherein a fitting is disposed adjacent each aperture, each fitting permitting releasable attachment of said first tube thereto so that said first tube lumen may be placed in fluid communication with said first fluid source.

2. The system of claim 1 wherein said aperture plate includes four apertures.

3. The system of claim 1 wherein:

said second fluid source comprises, a second fluid container and a second fluid container cap;

and said aperture plate is formed integrally with said cap.

4. The system of claim 1 wherein each aperture has a minimum diameter and the minimum diameters of each aperture are different.

5. The system of claim 1 further comprising a storage fitting configured to prevent the flow of fluid when said first tube is attached to said storage fitting.

6. The system of claim 1 further comprising a storage fitting configured to prevent the flow of fluid when said third tube is attached to said storage fitting.

7. The system of claim 5 wherein said storage fitting is located on a container of said second fluid.

* * * * *